Dec. 31, 1963 T. VASILOS ETAL 3,116,137
HOT PRESSED MATERIAL AND METHOD OF PRODUCING THE SAME
Filed July 1, 1958 3 Sheets-Sheet 1

THOMAS VASILOS
RICHARD B. WAGNER
INVENTORS

BY
ATTORNEYS

THOMAS VASILOS
RICHARD B. WAGNER
INVENTORS

BY
ATTORNEYS

Dec. 31, 1963   T. VASILOS ETAL   3,116,137
HOT PRESSED MATERIAL AND METHOD OF PRODUCING THE SAME
Filed July 1, 1958   3 Sheets-Sheet 3

THOMAS VASILOS
RICHARD B. WAGNER
INVENTORS

BY *Alden D. Redfield*
   *Warren Hunt*
   ATTORNEYS 3,116,137
HOT PRESSED MATERIAL AND METHOD OF
PRODUCING THE SAME
Thomas Vasilos, Winthrop, and Richard B. Wagner,
North Woburn, Mass., assignors to Avco Manufacturing Corporation, Cincinnati, Ohio, a corporation of Delaware
Filed July 1, 1958, Ser. No. 745,982
8 Claims. (Cl. 65—18)

The present invention concerns a hot pressed material and the method of producing it. More particularly, the invention concerns hot pressing of powdered vitreous substances, such as fused silica. Although significant advantages flow from using fused silica, and for convenience the invention will be described largely in terms of fused silica, it should be understood that other vitreous substances may be employed, as mentioned later in this specification.

Fused silica—not to be confused with quartz as will be explained shortly—is a highly desirable material because of its great thermal shock resistance and ability to transmit radiant energy with little energy loss. For some purposes, fused silica is also desirable for its ability to transmit light in the visible portion of the spectrum.

In the interest of clarity, it is important to emphasize the difference between quartz and the vitreous, amorphous, non-crystalline form of silica which is referred to in this specification as "fused silica." Although both substances are chemically $SiO_2$, there are marked differences in their physical characteristics. Whereas fused silica is amorphous and non-crystalline, quartz, which is usually alpha phase quartz, is crystalline and has a much higher coefficient of expansion than fused silica. A simplified list follows showing silicon dioxide phases through which alpha quartz passes upon being heated:

| Temperature | Phase |
| --- | --- |
| Room temperature to 573° C | Alpha quartz (crystalline). |
| 573° C.–870° C | Beta quartz (crystalline). |
| 870° C.–1470° C | Tridymite (crystalline). |
| 1470° C.–1625° C | Beta cristobalite (crystalline). |
| Above 1710° C | Fused silica (noncrystalline silica). |

For the purposes of this discussion, fused silica will mean the non-crystalline phase of silicon dioxide.

Prior art processes for making fused silica have had to contend with the danger of beta cristobalite formation. This is a crystalline form of $SiO_2$ which is objectionable since it has a relatively high coefficient of thermal expansion, about nine times greater than that of fused silica, and hence is unsuited for use in applications requiring thermal shock resistance.

Once fused silica is formed, it is relatively stable at temperatures below 1100° C. Between 1100° C. and 1470° C., however, it very slowly recrystallizes to beta cristobalite and does so rapidly at temperatures above 1470° C. It follows, therefore, that articles of fused silica may be used for prolonged periods at temperatures below 1100° C. Articles relatively free from cristobalite may be made from fused silica at temperatures below approximately 1470° C. if the silica is not held above 1100° C. for extended time periods. Short forming time and low temperature during formation tend to avoid cristobalite crystallization.

Casting of fused silica is well known. Since it is usually carried on at temperatures well in excess of 1600° C., however, deterioration of forming dies due to thermal cracking and oxidation is a problem and necessitates a protective atmosphere. Die deterioration also makes it impractical to form articles having fine details and sharp definition. If accurate dimensions are necessary, cast articles must be finished by grinding or glass blowing techniques. Furthermore, all known materials for making such dies have a substantial coefficient of expansion relative to fused silica. This may lead to rupture of the dies as they contract around the fused silica article during cooling.

As a result of such difficulties, attention has been focused on sintering processes. A common method involves sintering of powdered quartz at a temperature sufficiently high to cause fusion welding of adjacent particles without converting all of the quartz to vitreous fused silica. Other processes involve presintering articles from powdered quartz and then heating the articles to a temperature sufficiently high to convert the articles to vitreous silica. Several such processes are disclosed in Patent 2,270,718 entitled, "Article of Vitreous Quartz and Process for Producing and Working It," which issued to F. Skaupy on January 20, 1942.

To produce fusion welding of powdered quartz (alpha quartz) it is necessary to heat it to temperatures in excess of 1470° C., into the region where beta cristobalite forms rapidly. Although attempts have been made to avoid this difficulty by rapidly heating the quartz through the cristobalite range, the fact remains that formation of a certain amount of cristobalite is inevitable and must be accepted. Once beta cristobalite forms in a fused silica matrix, it is very difficult to dissolve in the matrix and converts to an equally objectionable form of alpha cristobalite upon cooling to room temperature.

Sintering processes are characterized by substantial shrinkage of the powdered materials during heating. This, combined with the tendency of sharp corners of an article to become round because of high surface tension of the heated material, makes dimensionally accurate manufacture impossible.

A further shortcoming of both cast and sintered articles is that porosity cannot be controlled, most such articles having less than 3% porosity.

By means of the present invention it is possible to produce a dimensionally accurate article of pure fused silica which is completely free of cristobalite and which is characterized by the desirable properties of vitreous silica.

In brief, the novel process comprises subjecting a vitreous powdered material simultaneously to heat and pressure for a sufficient length of time to result in formation of a consolidated material. The vitreous material at appropriate temperatures may be rendered viscous enough to permit consolidation of the powder by viscous flow in a time period so short that formation of objectionable crystalline phases is avoided. Thus, by use of the present invention, particles of powdered fused silica may be self-bonded by simultaneous application of heat and pressure and may be formed by a viscous flow mechanism into articles of complicated shape characterized by fineness of detail and dimensional accuracy. The process may be carried on at a temperature that is so low that no cristobalite forms. Since the forming temperature is relatively low, problems of die deterioration and chemical reaction of the dies with the materials being formed are minimized.

Materials may be formed by this novel process having desirable characteristics of pure silica, such as extremely low thermal coefficient of expansion and high radiant energy transmissivity.

In view of the foregoing it will be apparent that an important object of the present invention is to provide a process for producing articles from vitreous substances, and more specifically, a process for hot pressing fused silica.

It is also a broad object of the invention to provide a novel material comprising a hot pressed vitreous substance, and more specifically hot pressed fused silica.

A further object of the invention is to provide a method of making hot pressed silica materials of varying porosity.

The invention also comprehends a process for making articles of fused silica having controlled transmissivity to radiant energy.

It is also within the purview of the invention to provide a process for producing articles of fused silica in which are embedded a variety of reinforcements and operative structures, such as resistance-type heating elements and associated connectors.

Another important object of the invention is the provision of a process for pressing articles of fused silica characterized by fineness of detail and dimensional accuracy.

The novel features that are characteristic of the invention are set forth in the appended claims. The invention itself, however, together with additional objects and advantages thereof, will best be understood from the following description of specific processes and embodiments when read in conjunction with the accompanying drawings, in which:

It has been found that dense articles exhibiting many of the desirable characteristics of glassy, vitreous silica can be made by hot pressing powdered fused silica at temperatures in the range of 1050° C.–1450° C. and at pressures above 250 p.s.i. and usually in the range of 500–3000 p.s.i. The pressing operation can be accomplished in a relatively few minutes or over a period of several hours depending upon the particular characteristics of the materials that are desired. The process can be carried out in an ordinary atmosphere, or in a vacuum, or any other atmosphere, such as a hydrogen atmosphere, that may be desired. Carried on below 1200° C., the process yields a finished material that is entirely free of cristobalite. Even at temperatures close to 1450° C., very little cristobalite is formed. The initial material being fused silica, there is little or no tendency to form tridymite, another crystalline form of silica.

The fused silica used may be finely ground vitreous silica. The particle size is not critical and may be between one micron and 1000 microns. Particle size can be adjusted for the particular characteristics which are desired in the finished material. Generally speaking, the use of an admixture of fine and coarse particles will favor the formation of a denser material since the fine particles tend to fill the voids between the coarse ones. Increased density of material is favored by:

(a) High processing pressure
(b) Long pressing time
(c) High pressing temperature (within the recommended range)

To illustrate, a material that is so dense that it is translucent, and almost transparent, can be formed by hot pressing fused silica at 1250° C. at 2000 p.s.i. for a period of 3 hours. For such processing, the fused silica may be a half-and-half mixture of particles of −210+105 micron size and −105+45 micron size. Such material has significant strength, having a modulus of rupture of 7000 p.s.i.

Figure 1:
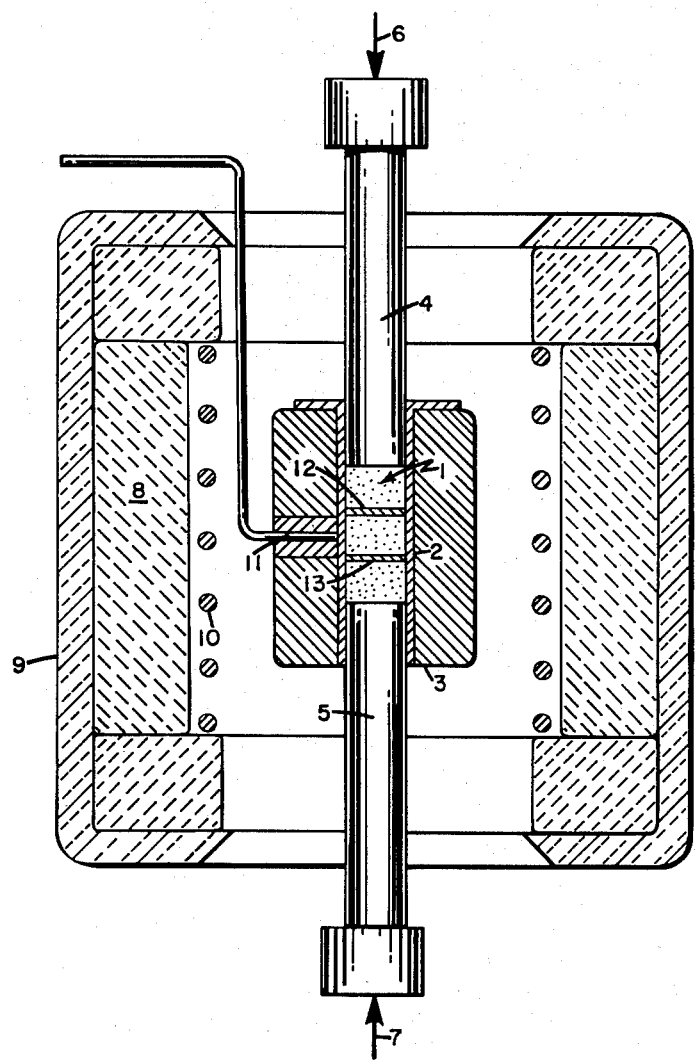
FIGURE 1 is a vertical sectional view through a furnace and press that may be used for hot pressing materials.

Turning attention now the FIGURE 1, there is shown a typical press for hot pressing articles of fused silica. The powdered fused silica is indicated generally at 1, confined within a graphite sleeve or die 2, which in turn is supported by a graphite die body 3. A pair of graphite punches 4 and 5 are slidably supported by the sleeve and serve to compress the powdered silica when pressure is applied to the punches by the rams of a hydraulic press (not shown), as suggested by arrows 6 and 7.

The graphite die body and fused silica are surrounded by fire brick 8 which in turn is held in position by quartz insulation 9. The insulation and fire brick form a furnace surrounding the die which may be heated in any suitable manner, as by electrical resistance heater 10 or by an induction heater. A thermocouple is shown at 11 to measure the temperature of the carbon sleeve adjacent the fused silica.

In FIGURE 1 graphite partitions 12 and 13 are shown within the confines of the graphite sleeve. Through use of such partitions, it is possible to make more than one, for example, three, in the case illustrated, articles simultaneously.

In practice, the fused silica is confined within the graphite sleeve by the punches and the furnace is assembled as illustrated. Pressure is then applied to the fused silica and the temperature is maintained for the desired period by the heating element. Because of the thermal shock resistance of fused silica, the articles may be removed from the dies as soon as the forming process is completed.

It is important to note that articles formed in this manner have great dimensional accuracy and stability. They will assume and hold exactly the dimensions of the graphite sleeve or other die that may be used.

For pressing operations carried out in the lower portion of the temperature range, dies may be made from stainless steel. In the upper portion of the range, dies may be made from graphite, aluminum oxide, steel, cermets, refractory metals, etc. Since graphite dies are more easily fabricated than aluminum oxide dies, they are preferred. Even with the use of graphite, die deterioration is not a significant problem since it does not oxidize readily. For pressing operations carried on at the top of the temperature range, it may be desirable to exclude oxygen from the graphite dies by conventional methods.

Reinforcement of hot pressed materials has been found to be particularly effective. Novel forms of reinforcement are described in detail in co-pending application Serial No. 740,987, filed on June 2, 1958, entitled "Honeycomb Reinforced Material and Method of Making the Same" by S. Motta, B. W. Rosen and T. Vasilos.

Figure 2:
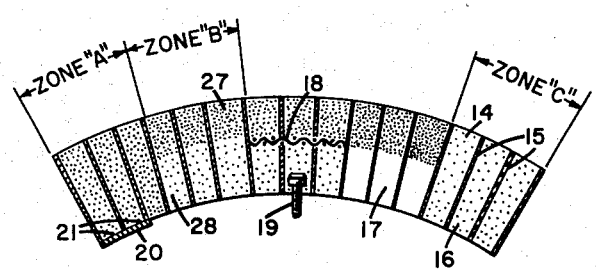
FIGURE 2 is a cross sectional view through a hot pressed article which demonstrates the versatility of the process.

FIGURE 2 illustrates a hot pressed object which demonstrates some of the various types of reinforcements that may be used. In this figure, hot pressed silica is shown at 14 within the cells of a metallic honeycomb reinforcing structure defined by walls 15. The entire honeycomb may be filled, as suggested at 16, or portions of the honeycomb cells may be unfilled, as indicated at 17. Voids, such as 17, may be formed during the process by filling the space to be left void by zirconium dioxide or similar materials which will not bond or harden during the forming process. Afterwards, the zirconium dioxide may be easily removed to form the voids.

The composite structure may be hot formed or coined at temperatures and pressures similar to those of the powder consolidation process.

Other types of reinforcements that have been found to be effective are metallic screens, such as shown at 18.

To facilitate attachment of an object, such as shown in FIGURE 2, to a substructure, fasteners, such as bolt 19, may be directly embedded in the silica. In the case illustrated, the threaded portion of the bolt projects from the silica while the head is securely anchored within the body of the silica. The threaded portion of the bolt obviously may be passed through an opening in the substructure and secured thereto.

For some purposes it is desirable to provide a metallic back on the object. This is illustrated at 20 where a sheet of metal, which may be the same as that of the honeycomb, is secured to the terminating edges 21 of a few cells of the honeycomb structure. The backing sheet may be attached to the honeycomb by welding prior to hot pressing of the silica. It is possible, however, to form the object with the honeycomb projecting slightly from the silica, as explained in the before-mentioned application. In this case, the backing sheet may be brazed to the honeycomb after formation of the silica. For certain applications, the backing sheet may be cemented to the object.

Figure 3:
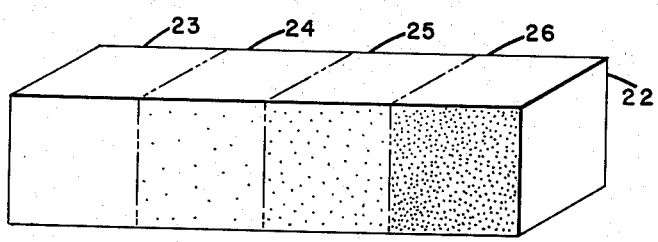
FIGURE 3 is a longitudinal sectional view through a hot pressed article having zones of different porosity.

Both FIGURES 2 and 3 illustrate that hot pressed fused silica may be made with different degrees of porosity. Porosity can be controlled both through forming pressure and temperature, as has been indicated, or by inclusion of a foreign substance which can be burned away after the forming process to leave voids in the final structure. Not only can the porosity of a given article be controlled over wide limits, but a single article can be made having zones of different porosity. Two illustrations are given.

In FIGURE 2, the fused silica within zones A, B, and C have different porosities and may be separately formed at different times. The material of one zone may be separated from material of the adjacent zone by the honeycomb reinforcement itself. Within anyone zone, however, such as zone B, the porosity may also vary. This is most easily explained by reference to FIGURE 3, which shows a bar of hot pressed fused silica 22 having one zone 23 at its left end having less than 5% porosity; zone 24 having 5 to 15% porosity; zone 25 having 15 to 25% porosity; and zone 26 having 25 to 50% porosity. These various zones may be produced in a single article as follows:

Zone 23: This may be formed by hot pressing fused silica at 1200° C. and 3000 p.s.i. for a period of 2 hours.
Zone 24: This may be formed by compression at 1200° C. and 2000 p.s.i. for a period of one hour.
Zones 25 and 26: These zones may be formed at 1200° C. and 2000 p.s.i. for a period of one hour, a quantity of finely powdered graphite being included in the material of each zone prior to compression. Obviously, about twice as much graphite would be included in zone 26 as in zone 25.

It will be noted that zones 24, 25, and 26 are all formed at the same temperature and pressure during an identical compression time. Thus, after formation of zone 23, fused silica may be added to the die to form zone 24, and fused silica bearing graphite may be added to form zones 25 and 26, and the composite may then be compressed for a period of one hour at 1200° C. and 2000 p.s.i. After compression, the resulting article is a rigid consolidated composite mass of fused silica and graphite (or any other combustible material). During the compression process, the graphite and fused silica particles are contained within the dies and accordingly, in an environment which is substantially free of air or oxygen. Although the hot pressing takes place at 1200° C. and graphite may be burned at 800° C., no graphite is oxidized or burned away during compression.

After the compression process, the resulting rigid composite article may be fired at about 800° C. for a period of 48 hours to burn away the graphite inclusions, resulting in the desired graduated porosity in the final article. The products of the combustion are not capable of deforming or otherwise changing the shape of the composite material since the fused silica, at the firing temperature of 800° C., is solid. It will be obvious that the size of the graphite particles may be chosen at will to provide a network of interconnected voids of any desired size. Actual experiments have shown, however, that porosity is easily controlled by using graphite having a particle size of 80 to 200 microns.

The same principles may be employed in forming the hot pressed silica of different porosity indicated at 27 and 28 in FIGURE 2.

Instead of graphite inclusions to produce porosity, particles of other substances, such as metals (iron, for example), may be incorporated in the silica and removed after consolidation by leaching, such as by dilute hydrochloric acid.

Figure 4:
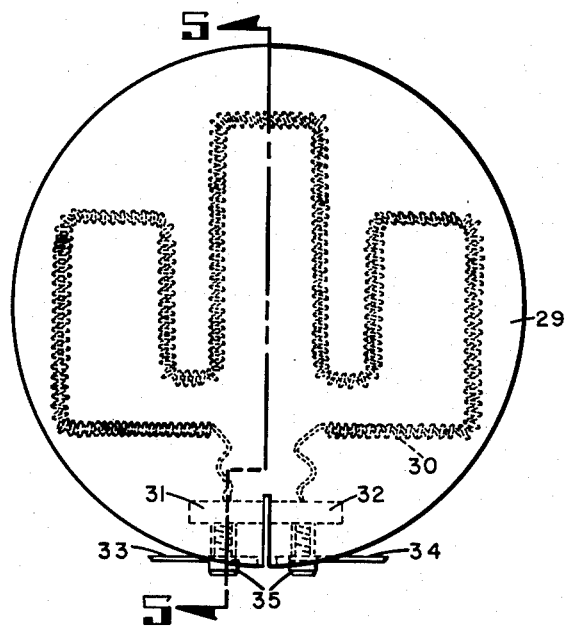
FIGURE 4 is a plan view of a hot pressed article having a heating element embedded in it; and, FIGURE 5 is a cross sectional view through the article of FIGURE 4 taken on plane 5—5 of that figure.
Figure 5:
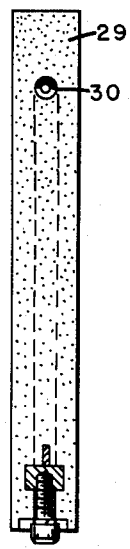

Attention should now be directed to FIGURES 4 and 5 which show a disc 29 of hot pressed fused silica within which is embedded an electrical resistance heating element 30. The ends of the heating element are secured to terminals 31 and 32 to which conductors 33 and 34, leading to a power supply (not shown) are connected by bolts 35.

It has been found by actual reduction to practice that the coefficient of expansion of hot pressed fused silica is so low that a heating element, such as 30, can be fully embedded within the silica and operated at red heat without in any way damaging the surrounding siliceous material. In fact, the structure is reasonably resistant to mechanical shock and is extremely resistant to thermal shock and will not crack even if chilled by cold water immediately after being operated at red heat.

A heating element that is well adapted for use in fused silica is made of a chromium, nickel, iron alloy. This alloy contracts as it cools from the silica forming temperature creating air spaces adjacent the heating element which prevent formation of internal stresses as the element heats up and cools down.

Obviously a structure such as shown in FIGURES 4 and 5, is well adapted for use as a surface heating unit for a domestic electric range. An important characteristic of the structure, when used for such purposes, is its ability to transmit infrared radiation with practically no absorption since fused silica will transmit radiant energy having a wave length less than 5 microns with very little energy loss.

Thus, if the structure of FIGURES 4 and 5 were used as a heating unit, a cooking utensil placed upon it would be heated not only by direct conduction from the unit to the utensil but also by infrared radiation to the utensil. This is of great importance since it eliminates the need for conformity between the utensil and unit and is highly conducive to rapid heating of the utensil.

Some applications, instead of requiring high transmissivity, require a reduction of transmissivity. It has been found that this may be readily accomplished by including finely divided carbon, such as lamp black, in the powdered fused silica. As little as 1% carbon by weight added to the powdered fused silica before hot pressing will reduce radiant heat transfer through the silica by 97%.

This invention has been described with particular reference to powdered substances which are formed into consolidated masses. It should be understood, however, that the invention may be broadly applied not only to powder (usually 1 micron to 1000 micron size) but also to larger particles and fragments of the substance being consolidated. For instance, the invention may be applied in consolidating fragments, having dimensions as large as one centimeter or more. The invention may also be applied to silica and other vitreous substances in fibrous form, such as silica wool.

Having described our invention, we claim:

1. The method of producing a translucent article of fused silica, a non-crystalline phase of silicon dioxide, comprising hot pressing powdered fused silica, a non-crystalline phase of silicon dioxide, at 1200° C. and at 2000 p.s.i. for a period of at least three hours.

2. The process of producing an object of fused silica, a non-crystalline phase of silicon dioxide, comprising subjecting powdered fused silica, a non-crystalline phase of silicon dioxide, to pressure in excess of 250 p.s.i. while maintaining the silica at a temperature in the range of 1050° C.–1450° C. until a consolidated mass is formed.

3. The method of producing an article of fused silica, a non-crystalline phase of silicon dioxide, which comprises placing powdered fused silica, a non-crystalline phase of silicon dioxide, between forming dies and maintaining the powdered fused silica, a non-crystalline phase of silicon dioxide, under pressure and at a temperature in the range of 1050° C.–1450° C. until a consolidated article is formed.

4. The process of producing an article of fused silica, a non-crystalline phase of silicon dioxide, which is substantially free from cristobalite inclusions comprising subjecting powdered fused silica, a non-crystalline phase of silicon dioxide, to pressure at a temperature less than 1200° C. for a time period sufficient to cause consolidation of the particles of silica.

5. The process for hot pressing powdered fused silica, a non-crystalline phase of silicon dioxide, which comprises compressing the powder at a pressure in excess of 250 p.s.i. and at a temperature in the range of 1050° C. to 1450° C. below the range where cristobalite forms and maintaining the temperature and pressure until a rigid product of said fused silica, a non-crystalline phase of silicon dioxide, is formed.

6. The process for producing a porous article of fused silica, a non-crystalline phase of silicon dioxide, which comprises placing an admixture of powdered fused silica, a non-crystalline phase of silicon dioxide, and graphite within forming dies, subjecting the powdered admixture to pressure in excess of 250 p.s.i. and heat in the temperature range of 1050° C. to 1450° C. until a solid article of said fused silica and graphite is formed having the shape of the dies, and subsequently subjecting the article to 800° C. temperature for a period of time sufficient to burn the graphite out of the article to develop porosity therein.

7. The process of producing a fused silica, a non-crystalline phase of silicon dioxide, article having zones of different porosity comprising subjecting powdered fused silica, a non-crystalline phase of silicon dioxide, to pressure in excess of 250 p.s.i. and temperature in the range of 1050° C. to 1450° C. sufficient to cause consolidation of the particles of silica thereby forming a first solid zone within the article, placing an admixture of powdered fused silica, a non-crystalline phase of silicon dioxide, and graphite adjacent the first zone and subjecting it to temperature in the range of 1050° C. to 1450° C. and pressure in excess of 250 p.s.i. sufficient to form a second zone of solidification comprising said fused silica and graphite within the article, and subsequently subjecting the article to 800° C. temperature for a time sufficient to burn the graphite out of the second zone whereby an article having zones of different porosity is produced.

8. The process for producing a porous article of fused silica, a non-crystalline phase of silicon dioxide, which comprises placing an admixture of powdered fused silica, a non-crystalline phase of silicon dioxide, and a combustible substance within forming dies, subjecting the powdered admixture to pressure in excess of 250 p.s.i. and heat in the temperature range of 1050° C. to 1450° C. until a consolidated article of said fused silica and said combustible substance is formed having the shape of the dies and subjecting the consolidated article to the combustible temperature for a period of time sufficient to burn the combustible substance out of and to develop porosity within the article.

References Cited in the file of this patent
UNITED STATES PATENTS

| | | |
|---|---|---|
| 829,427 | Potter | Aug. 28, 1906 |
| 1,051,638 | Rodman | Jan. 28, 1913 |
| 1,465,545 | Demongeot | Aug. 21, 1923 |
| 1,536,821 | Devers | May 5, 1925 |
| 1,610,182 | Thomson | Dec. 7, 1926 |
| 1,738,663 | Morse | Dec. 10, 1929 |
| 1,838,680 | Hudson | Dec. 29, 1931 |
| 2,270,718 | Skaupy | Jan. 20, 1942 |
| 2,310,432 | Haux | Feb. 9, 1943 |
| 2,459,209 | Zagwyn | Jan. 18, 1949 |
| 2,762,487 | Cummins et al. | Dec. 13, 1955 |
| 2,775,524 | D'Eustachio | Dec. 25, 1956 |
| 2,837,873 | Lunsavage | June 10, 1958 |
| 2,890,126 | Ford | June 9, 1959 |
| 2,890,127 | Ford | June 9, 1959 |
| 3,010,839 | Drumheller et al. | Nov. 28, 1961 |

FOREIGN PATENTS

| | | |
|---|---|---|
| 425,413 | Great Britain | Mar. 11, 1935 |
| 510,081 | Great Britain | July 20, 1939 |
| 622,218 | Great Britain | Apr. 28, 1949 |
| 549,723 | Canada | Dec. 3, 1957 |

OTHER REFERENCES

"Science," vol. 118, July 31, 1953, pages 131, 132, article titled, "A New Dense Crystalline Silica." (Copy in Scientific Library.)

UNITED STATES PATENT OFFICE
CERTIFICATE OF CORRECTION

Patent No. 3,116,137                      December 31, 1963

Thomas Vasilos et al.

It is hereby certified that error appears in the above numbered patent requiring correction and that the said Letters Patent should read as corrected below.

Column 2, line 29, for "strinkage" read -- shrinkage --; column 3, line 71, for "the" read -- to --; column 3, line 73, strike out "ported by a graphite die body 3. A pair of graphite" and insert the same after "is sup-" in line 75, same column 3; column 5, line 22, for "anyone" read -- any one --.

Signed and sealed this 26th day of May 1964.

(SEAL)
Attest:

ERNEST W. SWIDER                      EDWARD J. BRENNER
Attesting Officer                     Commissioner of Patents